(12) United States Patent
Inoue et al.

(10) Patent No.: US 10,044,881 B2
(45) Date of Patent: Aug. 7, 2018

(54) RELAY APPARATUS, COMMUNICATION SYSTEM AND COMMUNICATING METHOD

(75) Inventors: Toyoshi Inoue, Nagoya (JP); Takeshi Nagasaki, Nagoya (JP); Yusuke Shimada, Inazawa (JP); Satoshi Watanabe, Nagoya (JP); Katsuaki Ito, Nagoya (JP); Hirokazu Banno, Iwakura (JP); Kazutaka Yamamoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 836 days.

(21) Appl. No.: 13/284,613

(22) Filed: Oct. 28, 2011

(65) Prior Publication Data

US 2012/0113464 A1  May 10, 2012

(30) Foreign Application Priority Data

Nov. 4, 2010 (JP) ................................ 2010-247652

(51) Int. Cl.
  *G06F 15/16* (2006.01)
  *H04N 1/00* (2006.01)

(52) U.S. Cl.
  CPC ..... *H04N 1/00151* (2013.01); *H04N 1/00244* (2013.01); *H04N 1/00408* (2013.01);
  (Continued)

(58) Field of Classification Search
  CPC ........ G06Q 20/02; G06Q 20/36; G06F 19/32; G06F 3/12; G06F 8/65
  (Continued)

(56) References Cited

U.S. PATENT DOCUMENTS

| 8,640,117 B2 * | 1/2014 | Sugimoto ...................... 717/168 |
| 2002/0010785 A1 * | 1/2002 | Katsukawa ............ G06Q 20/02 |
| | | 709/229 |

(Continued)

FOREIGN PATENT DOCUMENTS

| JP | 2002-032216 A | 1/2002 |
| JP | 2005-269250 A | 9/2005 |
| JP | 2010-026562 A | 2/2010 |

OTHER PUBLICATIONS

Japan Patent Office, Notification of Reason for Refusal in counterpart Patent Application No. JP 2010-247652 (dispatch date Jan. 22, 2013).

*Primary Examiner* — Kevin Bates
*Assistant Examiner* — Emad Siddiqi
(74) *Attorney, Agent, or Firm* — Merchant & Gould P.C.

(57) ABSTRACT

A relay apparatus connected to service providing apparatuses respectively providing services and a communication apparatus that includes an additional-information storage unit configured to store additional information associated with the service and identification information, comprises: a receiving unit configured to receive notification including the service and the user identification information from the communication apparatus; a generating unit generating an output command for outputting, to the relay apparatus, the additional information stored in the additional-information storage unit corresponding to the service and the identification information included in the notification; an output commanding unit transmitting the output command to the communication apparatus; an acquiring unit acquiring the additional information output in response to the output command; a first communication unit configured to perform communication with the service providing apparatus using the acquired additional information; and a second commu- (Continued)

nication unit that transmits, to the communication apparatus, information acquired from the service providing apparatus.

21 Claims, 13 Drawing Sheets

(52) U.S. Cl.
CPC ............... *H04N 2201/0062* (2013.01); *H04N 2201/0094* (2013.01)

(58) Field of Classification Search
USPC ................ 709/229; 705/2; 726/28; 358/1.1; 717/168
See application file for complete search history.

(56) References Cited

U.S. PATENT DOCUMENTS

| | | | | |
|---|---|---|---|---|
| 2003/0182581 | A1* | 9/2003 | Isozaki | ........................ 713/201 |
| 2003/0220995 | A1* | 11/2003 | Hitaka | ............... H04N 1/00127 709/223 |
| 2005/0071763 | A1* | 3/2005 | Hart | ...................... G06K 15/00 715/731 |
| 2010/0100952 | A1* | 4/2010 | Sample | ................ H04L 51/066 726/9 |
| 2011/0178812 | A1* | 7/2011 | Lindsay | ........................... 705/2 |

* cited by examiner

FIG. 3

| TYPE INFORMATION | ACCOUNT | PASSWORD | AUTHENTICATION TOKEN | PREVIOUSLY USED ALBUM OWNER |
|---|---|---|---|---|
| SERVICE A | Tommy | 1111 | ABCDEF··· | Terry |
| SERVICE A | Terry | 2222 | FEDCBA··· | |
| SERVICE B | Terry | 3333 | ABCCBA··· | |

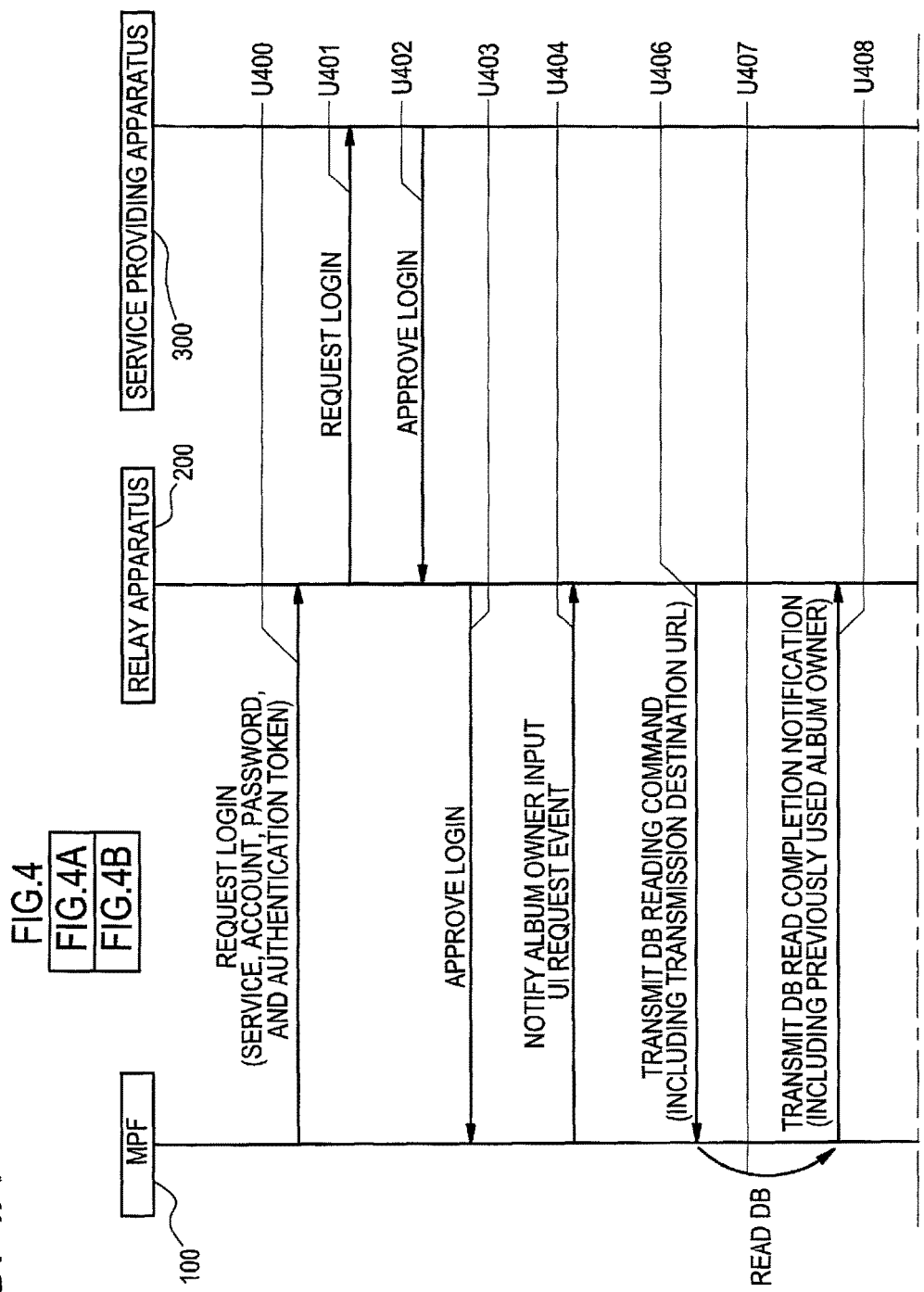

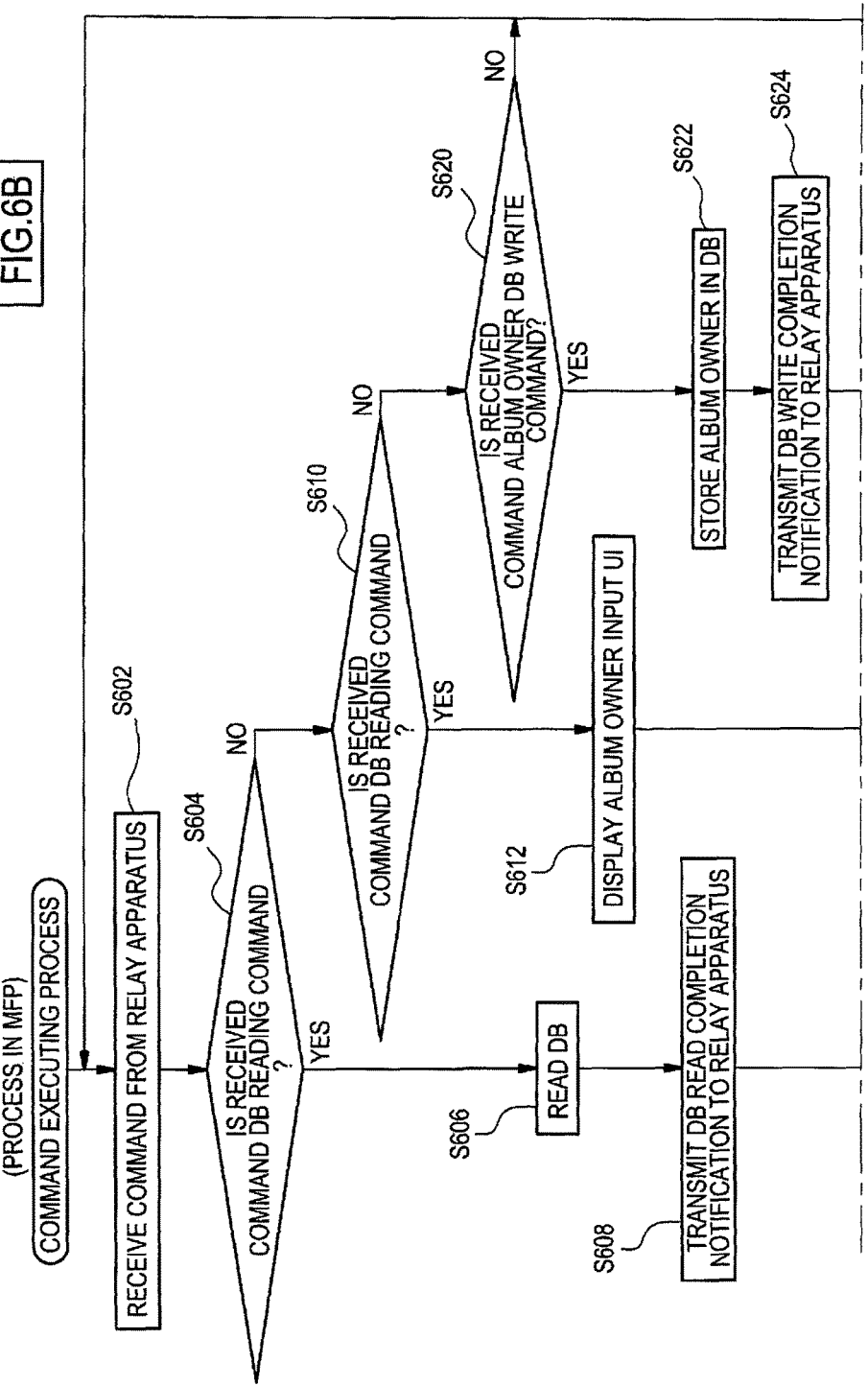

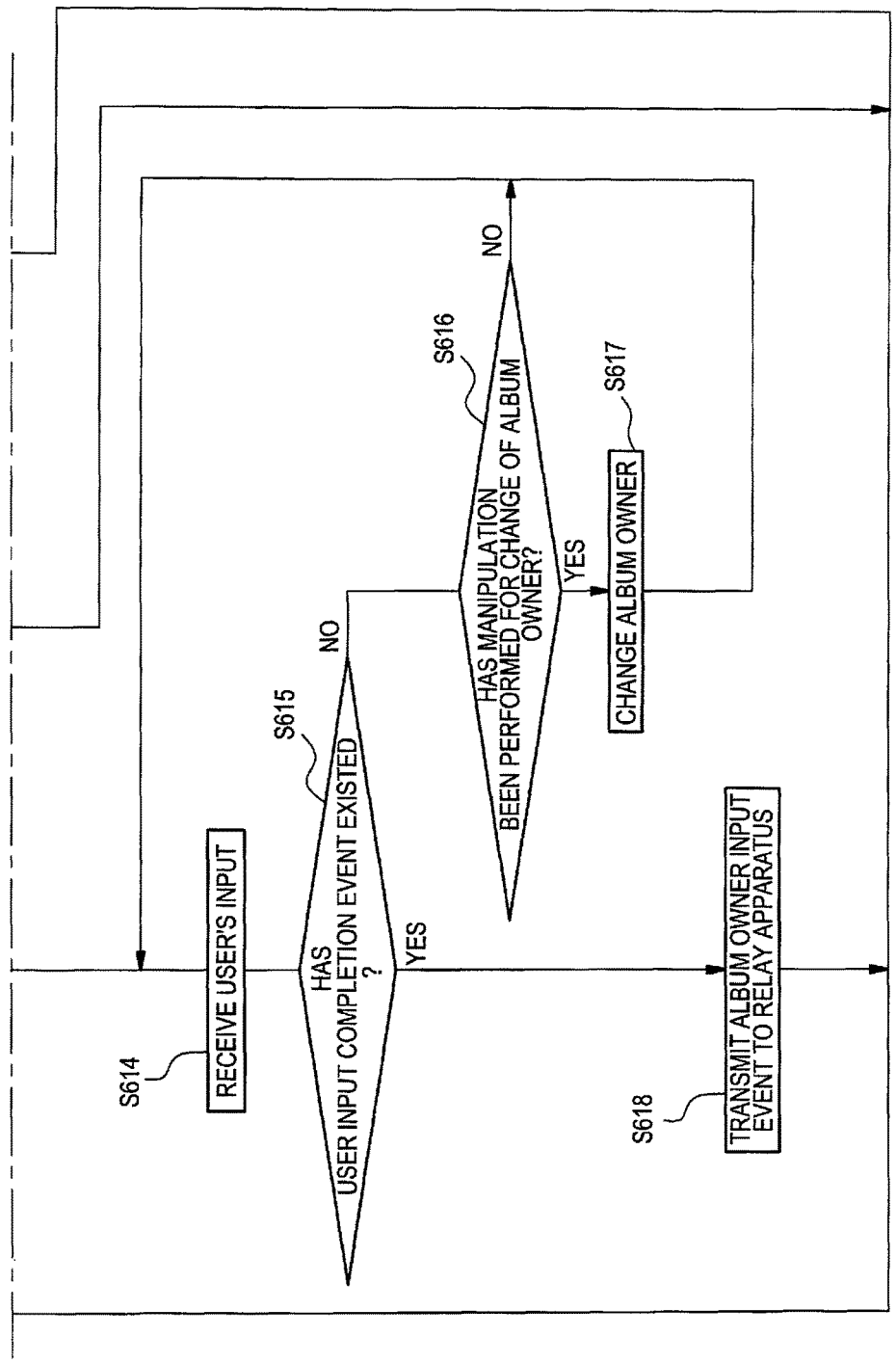

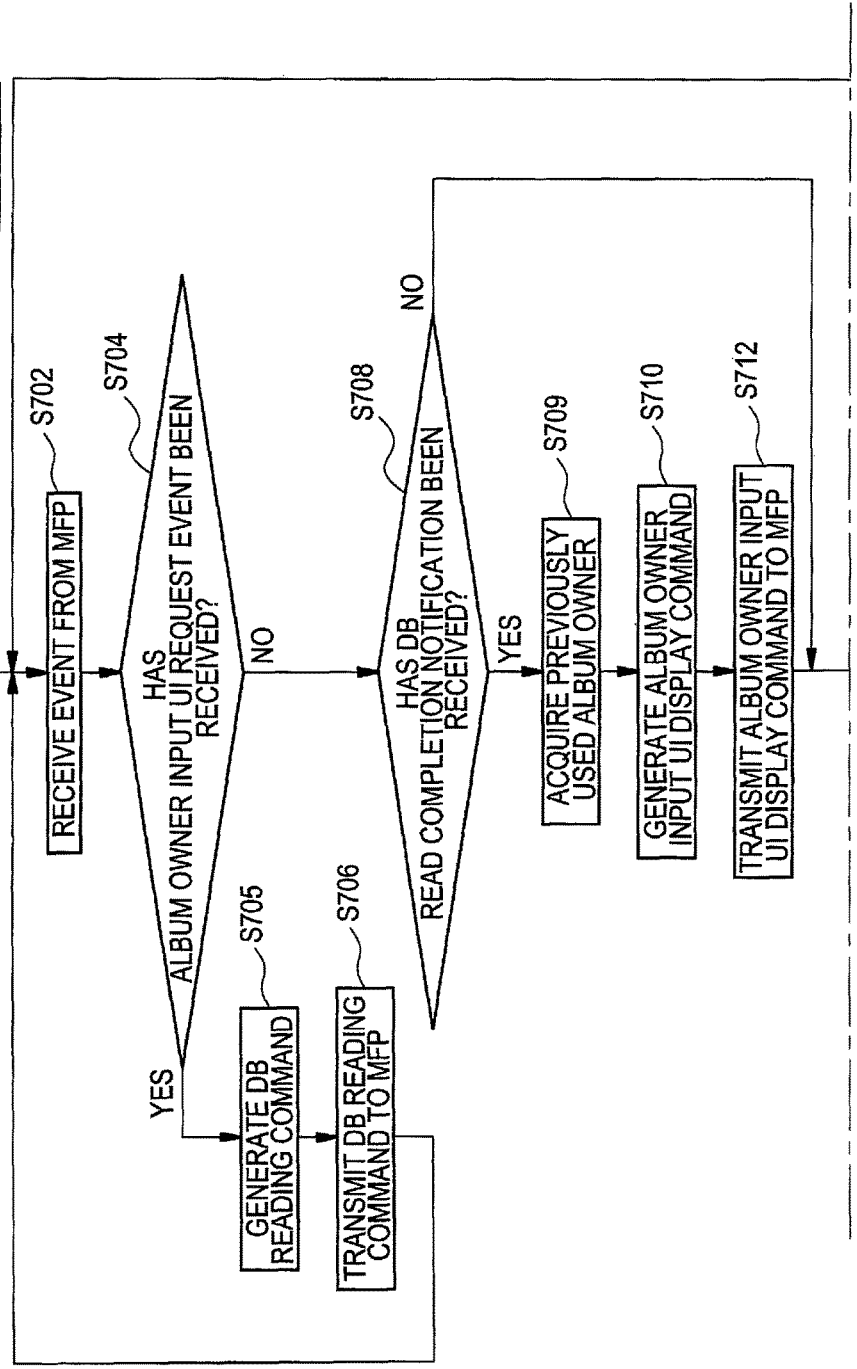

RELAY APPARATUS, COMMUNICATION SYSTEM AND COMMUNICATING METHOD

CROSS-REFERENCE TO RELATED APPLICATION

This application is based upon and claims the benefit of priority of Japanese Patent Application No. 2010-247652 filed on Nov. 4, 2010, the contents of which are incorporated herein by reference in its entirety.

BACKGROUND

The present disclosure relates to a relay apparatus, a communication system and a communicating method.

An image reading apparatus for uploading an electronic file of a read image to a server is known. Also, printers for printing electronic files downloaded from servers are known. In order to provide these services, makers of image reading apparatuses or printers may prepare dedicated servers on their own for the services.

Meanwhile, electronic-file storing services capable of storing electronic files in a database prepared on a network by a service provider are in widespread use. For example, a Picasa (a registered trademark) web album and flickr (a registered trademark) are examples of the electronic-file storing services. Users can use communication apparatuses having web browsers to upload or download desired electronic files in the electronic-file storing services. The electronic-file storing services disclose their own application program interfaces (API). Other providers can use the APIs to provide new services cooperating with the electronic-file storing services. For example, if programs for using the APIs that the electronic-file storing services disclose are installed in the image reading apparatuses and the printers, the users can directly upload or download electronic files in the electronic-file storing services by the image reading apparatuses and the printers.

SUMMARY

However, the APIs may be updated for service provider's reasons. Even when the APIs are updated, in order to maintain coordination between the image reading apparatuses and the electronic-file storing services and between the printers and the electronic-file storing services, the internal programs of the image reading apparatuses and the printers owned by the users should be appropriately updated. Also, even in a case where an electronic-file storing service capable of cooperating is added or erased, it is required to rewrite the internal programs of the image reading apparatus and the printers owned by the users.

An aspect of the disclosure was made to solve the problems, and an object is to provide a communication system and a relay apparatus capable of enabling a communication apparatus to acquire information, which can be obtained by communication with a service providing apparatus, even when the communication apparatus has no program for performing communication with the service providing apparatus, and suppressing an operational cost of the relay apparatus or an equipment investment cost for the relay apparatus.

An aspect of the disclosure provides the following arrangements:

A relay apparatus connectable through a network to a plurality of service providing apparatuses respectively providing services and a communication apparatus that includes an additional-information storage unit configured to store additional information associated with a combination of the service and user identification information registered in the corresponding service, the relay apparatus comprising:
a program storage unit configured to store plural pieces of programs for performing communication with corresponding one of the plurality of service providing apparatuses;
a receiving unit configured to receive notification including the service and the user identification information from the communication apparatus;
an output-command generating unit configured to generate an output command for commanding the communication apparatus to output, to the relay apparatus, the additional information stored in the additional-information storage unit corresponding to the service and the user identification information included in the notification received by the receiving unit;
an output commanding unit configured to transmit the output command generated by the output-command generating unit, from the relay apparatus to the communication apparatus;
an additional-information acquiring unit configured to acquire the additional information output from the communication apparatus in response to the output command;
a first communication unit configured to perform communication with the service providing apparatus corresponding to the service included in the notification received by the receiving unit, using the additional information acquired by the additional-information acquiring unit and the program stored in the program storage unit; and
a second communication unit that transmits, to the communication apparatus, information on the service acquired from the service providing apparatus by the communication through the first communication unit.

A communication system comprising a relay apparatus connected to a network, and a communication apparatus connected to the relay apparatus through the network, wherein:
in the network, a plurality of service providing apparatuses for providing services exist,
the communication apparatus comprises:
an additional-information storage unit configured to store additional information associated with a combination of the service and user identification information registered in the corresponding service;
a service notifying unit configured to notify the service selected in the communication apparatus to the relay apparatus;
an identification-information notifying unit configured to notify user identification information selected in the communication to the relay apparatus; and
a command executing unit configured to output the additional information stored in the additional-information storage unit, in response to an output command received from the relay apparatus,
the relay apparatus comprises:
a program storage unit configured to store a program for performing communication with each of the plurality of service providing apparatuses;
a receiving unit configured to receive notification including the service and the user identification information from the service notifying unit and the identification-information notifying unit;
an output-command generating unit configured to generate an output command for commanding the communication apparatus to output, to the relay apparatus, the additional information stored in the additional-information storage unit corresponding to the service and the user identification information included in the notification received by the receiving unit;

an additional-information acquiring unit configured to acquire the additional information output from the communication apparatus in response to the output command;

a first communication unit configured to perform communication with the service providing apparatus corresponding to the notification including the service received by the receiving unit, using the additional information acquired by the additional-information acquiring unit and the program stored in the program storage unit; and a second communication unit configured to transmit, to the communication apparatus, information on the service acquired from the service providing apparatus by the communication through the first communication unit.

A method of communicating through a network with a plurality of service providing apparatuses respectively providing services and a communication apparatus that includes an additional-information storage unit configured to store additional information associated with a combination of the service and user identification information registered in the corresponding service, the method comprising:

storing plural pieces of programs for performing communication with corresponding one of the plurality of service providing apparatuses;

receiving notification including the service and the user identification information from the communication apparatus;

generating an output command for commanding the communication apparatus to output, to the relay apparatus, the additional information stored in the additional-information storage unit corresponding to the service and the identification information included in the received notification;

transmitting the generated output command to the communication apparatus;

acquiring the additional information output from the communication apparatus in response to the output command;

performing communication with the service providing apparatus corresponding to the service included in the received notification, using the acquired additional information; and transmitting information on the service acquired from the service providing apparatus to the communication apparatus.

BRIEF DESCRIPTION OF DRAWINGS

FIG. 3 is a view schematically illustrating a configuration of a database (DB) provided in an multi-function device (MFP).

FIGS. 4A and 4B are a sequence diagram illustrating an information flow between the service cooperation system and a service providing apparatus.

FIGS. 6A and 6B are a flow chart illustrating a command executing process executed in the MFP.

FIGS. 7A and 7B are a flow chart illustrating an MFP responding process executed in a relay apparatus.

DESCRIPTION OF EXEMPLARY EMBODIMENTS

Hereinafter, an exemplary embodiment will be described with reference to the accompanying drawings. A service cooperation system 10 includes a multi-function device 100 (hereinafter, referred to as the MFP 100) and a relay apparatus 200. The MFP 100 is a combined device having a print function, a scanner function, a fax function, and a copy function. The relay apparatus 200 is a server disposed by a maker of the MFP 100, and has a program necessary for using an API disclosed by a service provider. A service providing apparatus 300 is a known web server disposed on the Internet by the service provider.

In the service cooperation system 10, the relay apparatus 200 generates an HTTP message using the API in response to a request received from the MFP 100, transmits the HTTP message to the service providing apparatus 300, and communicates with the service providing apparatus 300 so as to obtain information. This information is transmitted from the relay apparatus 200 to the MFP 100. According to the service cooperation system 10, even when the MFP 100 has no program for performing communication with the service providing apparatus 300, the MFP 100 can obtain information on a service that can be obtained by communication with the service providing apparatus 300. This will be described below in detail.

In the description of the present embodiment, the service provider provides a service for collectively managing image files as an album, and discloses an API for storing an uploaded image file in the service providing apparatus 300 in association with an album, an API for acquiring an album name managed by the service providing apparatus 300, and the like. Actually, a plurality of MFPs 100 using the service through the relay apparatus 200 exist. However, the following description of the present embodiment will be made, focusing on one MFP 100.

Figure 1:
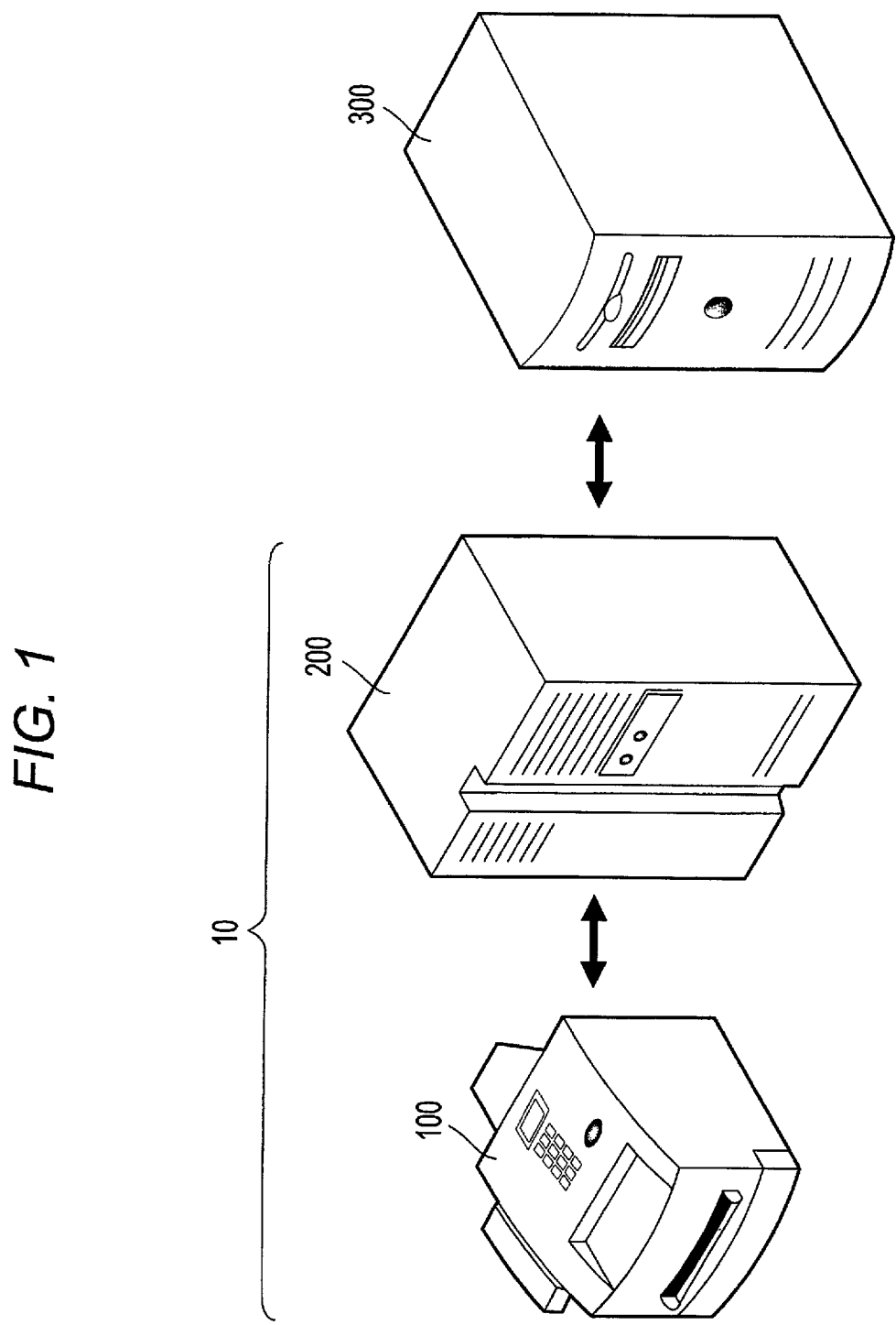
FIG. 1 is a schematic diagram illustrating a service cooperation system according to an embodiment.
Figure 2:
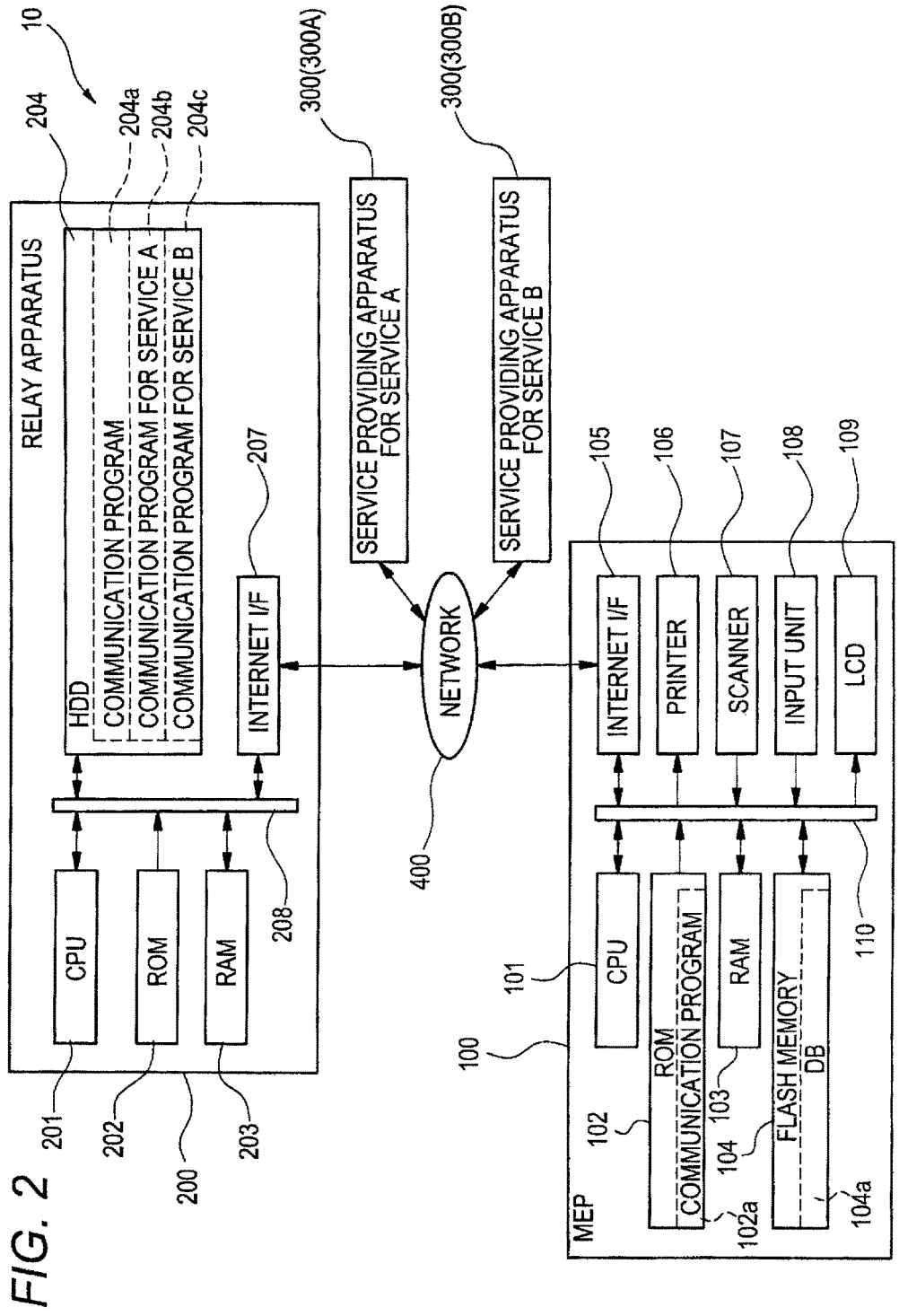
FIG. 2 is a block diagram schematically illustrating an electrical configuration of the service cooperation system.

As shown in FIG. 2, the MFP 100, the relay apparatus 200, and the service providing apparatus 300 are connected to one another through a network 400, and perform data transmission and reception with one another in accordance with HTTP. The network 400 may be made of an Ethernet network. In the present embodiment, it is assumed that two service providing apparatuses 300 for providing two services different from each other exist in the network 400. In the following description, in a case where it is necessary to particularly distinguish both service providing apparatuses 300 from each other, an apparatus for providing the service A is referred to as a service providing apparatus 300A, and an apparatus for providing the service B is referred to as a service providing apparatus 300B.

The MFP 100 mainly includes a CPU 101, a ROM 102, a RAM 103, a flash memory 104, an internet interface (internet I/F) 105, a printer 106, a scanner 107, an input unit 108, and a liquid crystal device (LCD) 109, which are connected to one another through bus lines 110.

The CPU 101 executes processes in accordance with programs stored in the ROM 102. The ROM 102 is a memory for storing programs and the like for controlling an operation of the MFP 100, and stores a communication program 102a. The communication program 102a is a program for performing data transmission and reception according to HTTP, and acts as an XMT parser for interpreting XML. However, the communication program 102a does not act as an HTML parser for interpreting HTML. In other words, the communication program 102a does not act as a browser. Therefore, the MFP 100 can interpret information written in XML but cannot interpret information written in HTML.

The RAM 103 temporarily stores information necessary for the processes of the CPU 101. The flash memory 104 is a non-volatile memory, and stores a database (DB) 104a. The DB 104a will be described below with reference to FIG. 3.

The internet I/F 105 is a device for performing communication with other apparatuses through the network 400, and a known network card can be used as the internet I/F 105. The printer 106 is a device for printing images, and the scanner 107 is a device for reading images. The input unit 108 is made of a touch panel for inputting instructions or information to the MFP 100, and is superimposed on a display surface of the LCD 109. The MFP 100 displays screens on the LCD 109 on the basis of display commands input through the internet I/F 105.

The relay apparatus 200 mainly includes a CPU 201, a ROM 202, a RAM 203, a hard disk drive (HDD) 204, and an internet interface (internet I/F) 207, which are connected to one another through bus lines 208.

The CPU 201 executes processes in accordance with programs stored in the ROM 202 or the HDD 204. The ROM 202 stores programs and the like for controlling an operation of the relay apparatus 200. The RAM 203 temporarily stores data necessary for the processes of the CPU 201.

The HDD 204 stores a communication program 204b for the service A and a communication program 204c for the service B. The communication program 204a is a program for performing data transmission and reception according to HTTP, and acts as an XML parser for interpreting XML. Each of the communication program 204b for the service A and the communication program 204c for the service B is a program for performing communication with the service providing apparatus 300. In accordance with the communication program 204b for the service A, an HTTP message using an API provided by the service A is generated, and in accordance with the communication program 204c for the service B, an HTTP message using an API provided by the service B is generated. The internet I/F 207 is a device for performing communication with other apparatuses connected to the network 400.

The DB 104a stores type information, an account, a password, and an authentication token in association with one another. The type information represents the type of the service provided by the service provider. The account is identification information for identifying a user with the right to log in to the service specified by the type information. The password is a character string used in combination with the account when the user logs in to the service specified by the type information. The authentication token is information transmitted to the service providing apparatus 300 providing the service in a case of logging in to the service specified by the type information.

If a service and an account are selected in the MFP 100, the MFP 100 requests the user to input a password. In a case where the password input by the user corresponds to a password stored in the DB 104a in association with a combination of the selected service and account, the MFP 100 transmits the selected account, the password associated with the account, and an authentication token to the relay apparatus 200. The relay apparatus 200 transmits the received account, the password associated with the account, and the authentication token to the service providing apparatus 300 providing the service selected by the user. Meanwhile, the service providing apparatus 300 approves the login on the basis of the account and so on.

The DB 104a further stores a previously used album owner in association with each combination of type information and an account. The previously used album owner is information representing an album owner set as a search condition for acquiring an album name in the previous login process using a combination of a service specified by type information and an account associated with the corresponding type information.

If the user selects a service and an account and inputs a password in the MFP 100, the MFP 100 notifies the relay apparatus 200 of the type information of the service, the account, and the password, and an authentication token stored in the DB 104a in association with them, and requests a login in step U400. In step U401, the relay apparatus 200 requests a login by transmitting the account, the password, and the authentication token to the service providing apparatus 300 providing the service based on the type information notified by the MFP 100. Then, if the service providing apparatus 300 authenticates the account and the password so as to determine that the authentication token is valid, the service providing apparatus 300 notifies approval of the login to the MFP 100 through the relay apparatus 200, in steps U402 and U403.

After the approval of the login, the type information representing the logged-in service, the account, the password, and the authentication token are added to information transmitted and received between the relay apparatus 200 and the MFP 100 (for example, each command transmitted from the relay apparatus 200 to the MFP 100, and information output from the MFP 100 to the relay apparatus 200 in response to the corresponding command). Therefore, even when a plurality of MFPs 100 using the service through the relay apparatus 200 exit, the relay apparatus 200 can identify each MFP 100 on the basis of information transmitted from the corresponding MFP 100. For this reason, it is not required to provide a database for storing an account and the like of a logged-in MFP 100, to the relay apparatus 200. Therefore, it is possible to reduce a load on the relay apparatus 200. Further, it is possible to suppress the possibility that private information of the user stored in the relay apparatus 200 will be leaked.

Next, in step U404, the MFP 100 notifies the relay apparatus 200 of an album owner input interface (UI) request event. The album owner input UI request event has the type information of the logged-in service and the account added thereto. If receiving the album owner input UI request event, the relay apparatus 200 generates a DB reading command. The DB reading command is for instructing the MFP 100 to output, to the relay apparatus 200, the previously used album owner stored in the DB 104a in association with the combination of the type information of the logged-in service and the account. The DB reading command further includes a transmission destination URL designating a transmission destination of information from the MFP 100 to the relay apparatus 200. In step U406, the relay apparatus 200 transmits the generated DB reading command to the MFP 100 which is the transmitter of the album owner input UI request event.

If receiving the DB reading command, in step U407, the MFP 100 reads the DB 104*a*. Then, the MFP 100 acquires the previously used album owner stored in the DB 104*a* in association with the type information of the logged-in service and the account. Next, in step U408, the MFP 100 transmits a DB read completion notification to the transmission destination URL designated by the relay apparatus 200. The DB read completion notification includes the previously used album owner acquired from the DB 104*a*.

Next, in step U410, the relay apparatus 200 generates an album owner input UI display command and transmits the album owner input UI display command to the MFP 100, The album owner input UI display command includes UI display data. The MFP 100 displays an album owner input UI on the LCD 109 on the basis of the UI display data.

Figure 5A:
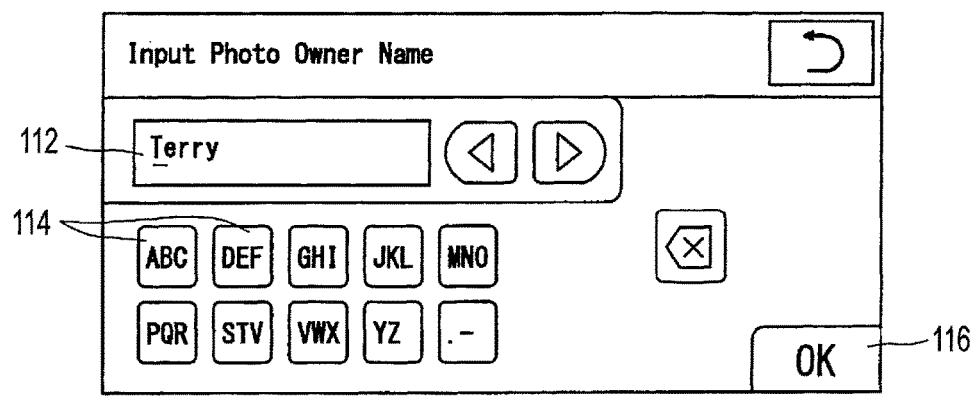
FIG. 5A is a view illustrating an example of an album owner input user interface (UI) displayed in the MFP.

As shown in FIG. 5A, the album owner input UI includes an input box 112, edit keys 114, and an OK key 116 as components. The input box 112 displays an album owner. In the input box 112, the previously used album owner transmitted from the MFP 100 to the relay apparatus 200 is contained as an initial value. Specifically, the relay apparatus 200 includes the previously used album owner received from the MFP 100 in the UI display data and returns the UI display data including the previously used album owner to the MFP 100, such that the previously used album owner is displayed as the initial value of the input box 112 of the album owner input UI. However, for example, the relay apparatus 200 may transmit, to the MFP 100, designation information for specifying the previously used album owner output from the MFP 100 to the relay apparatus 200, and the MFP 100 may read, from the DB 104*a*, the previously used album owner specified by the designation information received from the relay apparatus 200 and display the previously used album owner as the initial value of the input box 112.

The edit keys 114 are keys for editing an album owner displayed in the input box 112. As described above, the touch panel is superimposed on the LCD 109 of the MFP 100. Therefore, the user of the MFP 100 rewrites the album owner displayed in the input box 112 by touching the edit keys 114. The OK key 116 is a key for confirming the album owner displayed in the input box 112. If the user touches the OK key 116, the MFP 100 confirms the album owner displayed in the input box 112.

Since the MFP 100 is merely required to display UIs in response to display commands from the relay apparatus 200, even when the MFP 100 does not have programs for using APIs provided in a plurality of kinds of services, the MFP 100 can display the UI for enabling the user to input the album owner. Also, it is assumed that the UI display data transmitted from the relay apparatus 200 to the MFP 100 is written in XML. Then, even when the MFP 100 cannot interpret web pages having an HTML format provided by various kinds of service providing apparatuses 300, the MFP 100 can display the UI for enabling the user to input the album owner.

Also, since the previously used album owner transmitted from the MFP 100 to the relay apparatus 200 is displayed as the initial value of the album owner input UI, it is possible to display an album owner likely to be reused, as the initial value, thereby reducing a manipulation load on the user. Further, it is possible to inform the previously used album owner transmitted from the MFP 100 to the relay apparatus 200, to the user of the MFP 100.

Figure 4B:
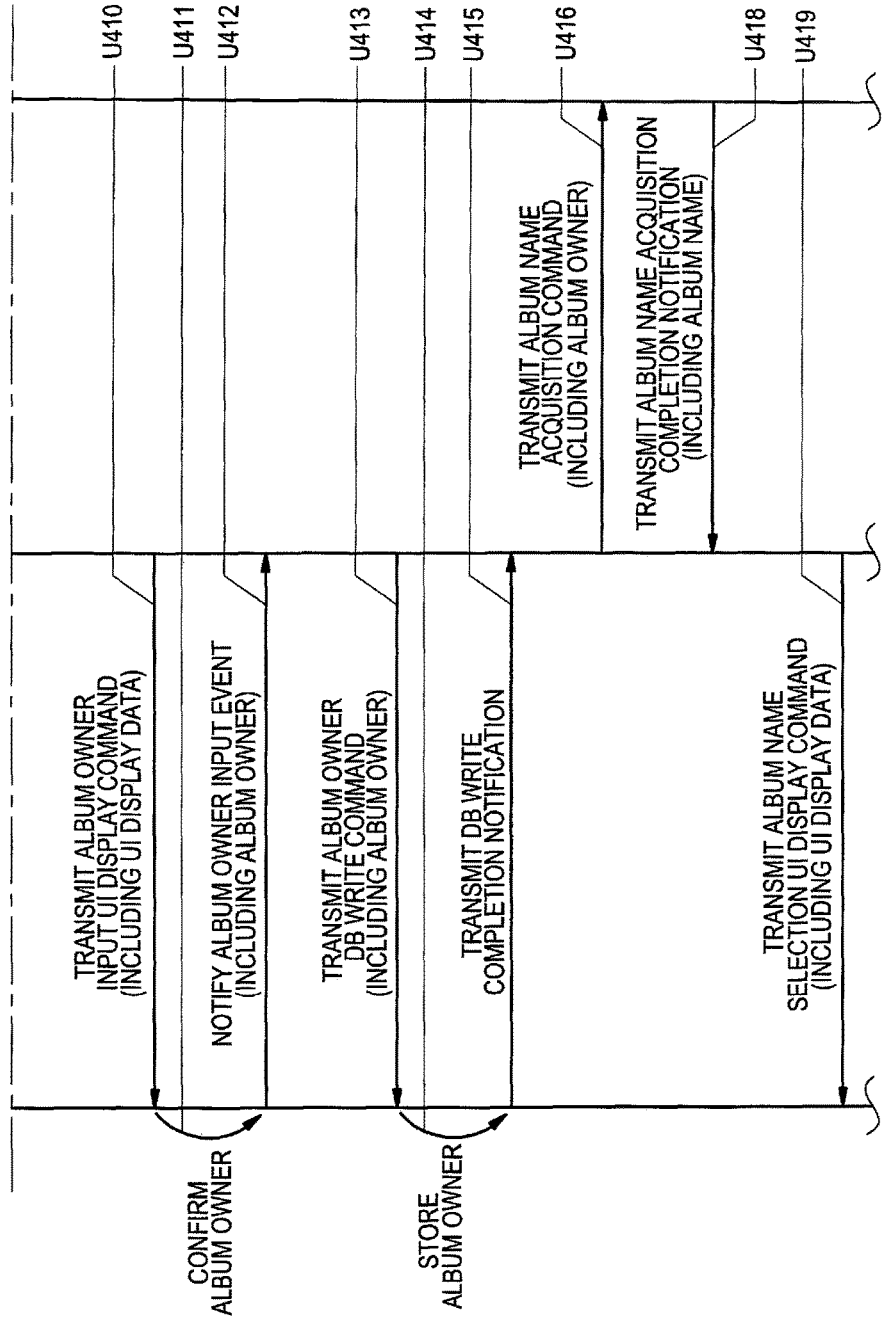

Referring to FIG. 4 again, if the user confirms the previously used album owner, which is the initial value of the input box 112, in step U411 without performing a manipulation for changing the initial value, the MFP 100 includes the previously used album owner in an album owner input event and notifies the relay apparatus 200 of the album owner input event including the previously used album owner in step U412. Meanwhile, if the album owner displayed in the input box 112 is changed by a user's manipulation, the MFP 100 includes the changed album owner in the album owner input event and notifies the relay apparatus 200 of the album owner input event including the changed album owner in step U412.

If receiving the album owner changed by the user's manipulation, from the MFP 100, the relay apparatus 200 generates an album owner DB write command for storing the corresponding album owner in the DB 104*a*, and transmits the album owner DB write command to the MFP 100, in step U413. The album owner DB write command includes the album owner changed by the user's manipulation.

In step U414, the MFP 100 stores the album owner, included in the album owner DB write command received from the relay apparatus 200, in the DB 104*a* in association with the combination of the type information of the logged-in service and the account. If there is a previously used album owner stored previously in association with the combination of the type information of the logged-in service and the account, the MFP 100 overwrites the previously used album owner with the album owner received from the relay apparatus 200. Next, in step U415, the MFP 100 transmits a DB write completion notification to the relay apparatus 200.

Next, the relay apparatus 200 performs communication with the service providing apparatus 300 providing the service notified by the MFP 100. Specifically, in step U416, the relay apparatus 200 generates an album name acquisition command in accordance with the communication program 204*b* for the service A or the communication program 204*c* for the service B, and transmits the album name acquisition command to the service providing apparatus 300. Here, the album name acquisition command is an HTTP message for using the API disclosed in the service based on the type information notified by the MFP 100. The album name acquisition command includes the album owner notified to the relay apparatus 200 by the MFP 100.

If receiving the album name acquisition command, the service providing apparatus 300 reads a database (not shown) managing album names, so as to acquire an album name associated with the album owner included in the album name acquisition command. Then, in step U418, the service providing apparatus 300 transmits an album name acquisition completion notification to the relay apparatus 200 which is the transmitter of the album name acquisition command. The album name acquisition completion notification includes the album name associated with the album owner.

Next, the relay apparatus 200 transmits the information obtained by the communication with the service providing apparatus 300, to the MFP 100. Specifically, the relay apparatus 200 generates UI display data for displaying an album name selection UI including the album name acquired from the service providing apparatus 300 in the MFP 100, and transmits an album name selection UI display command including the UI display data to the MFP 100 in step U419.

Figure 5B:
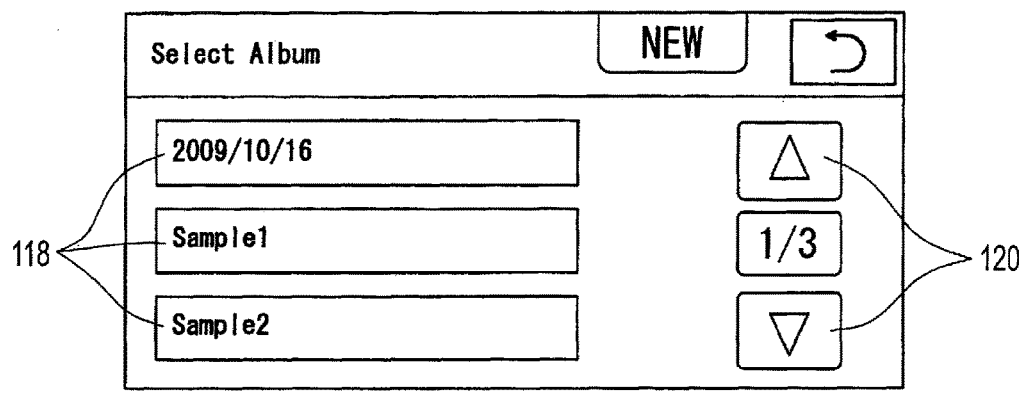
FIG. 5B is a view illustrating an example of an album name selection UI displayed in the MFP.
Figure 7B:
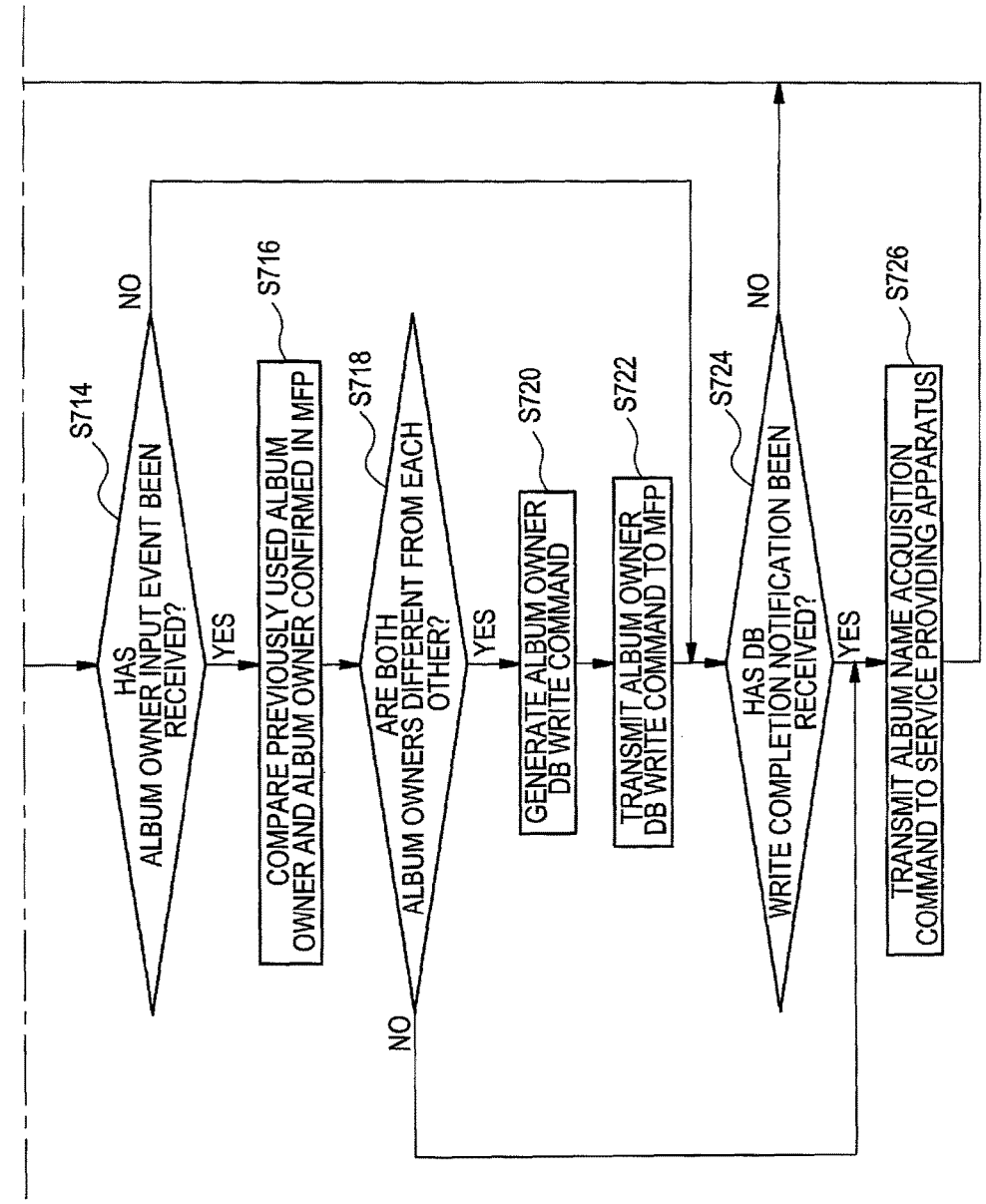
Figure 8:
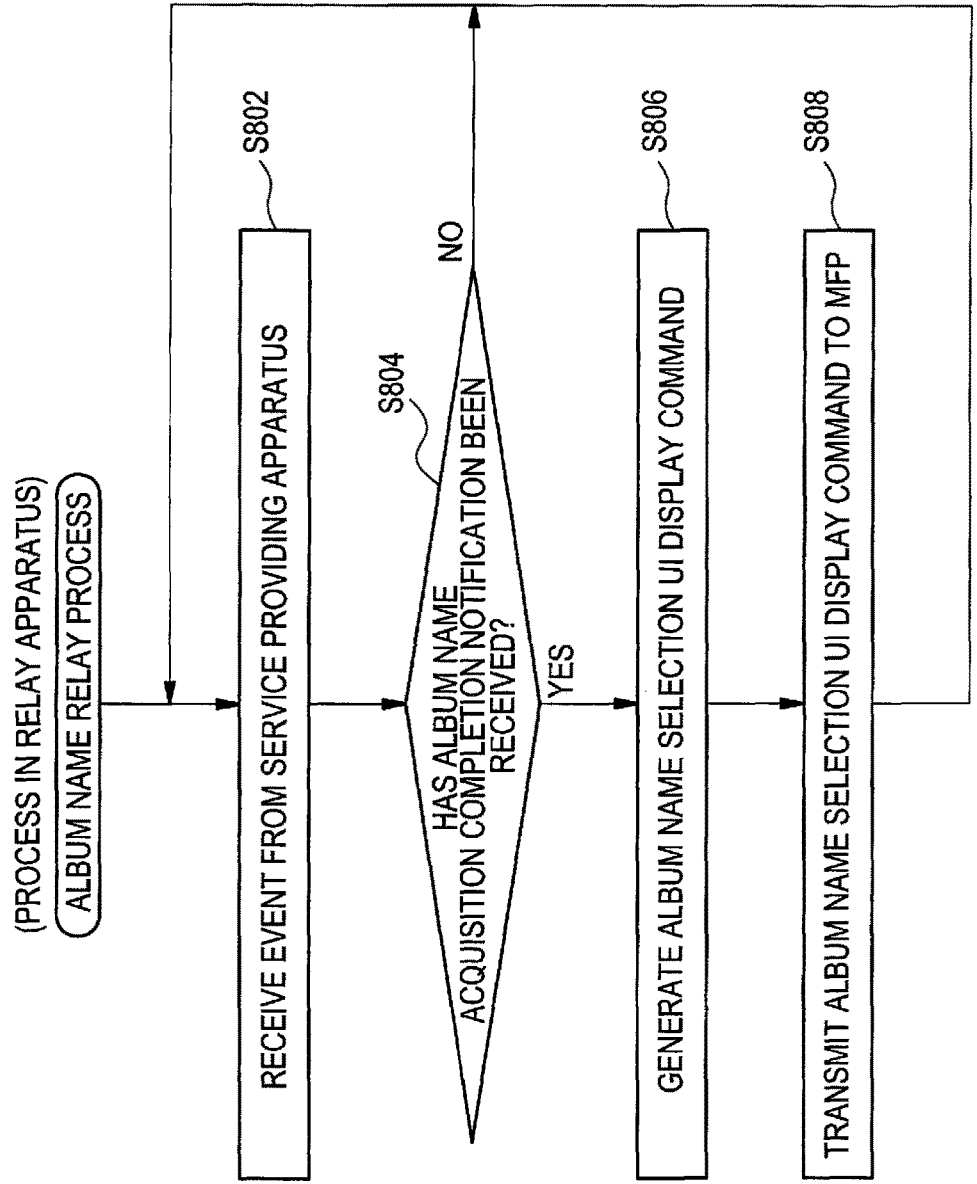
FIG. 8 is a flow chart illustrating an album name relay process executed in the relay apparatus.
Figure 9:
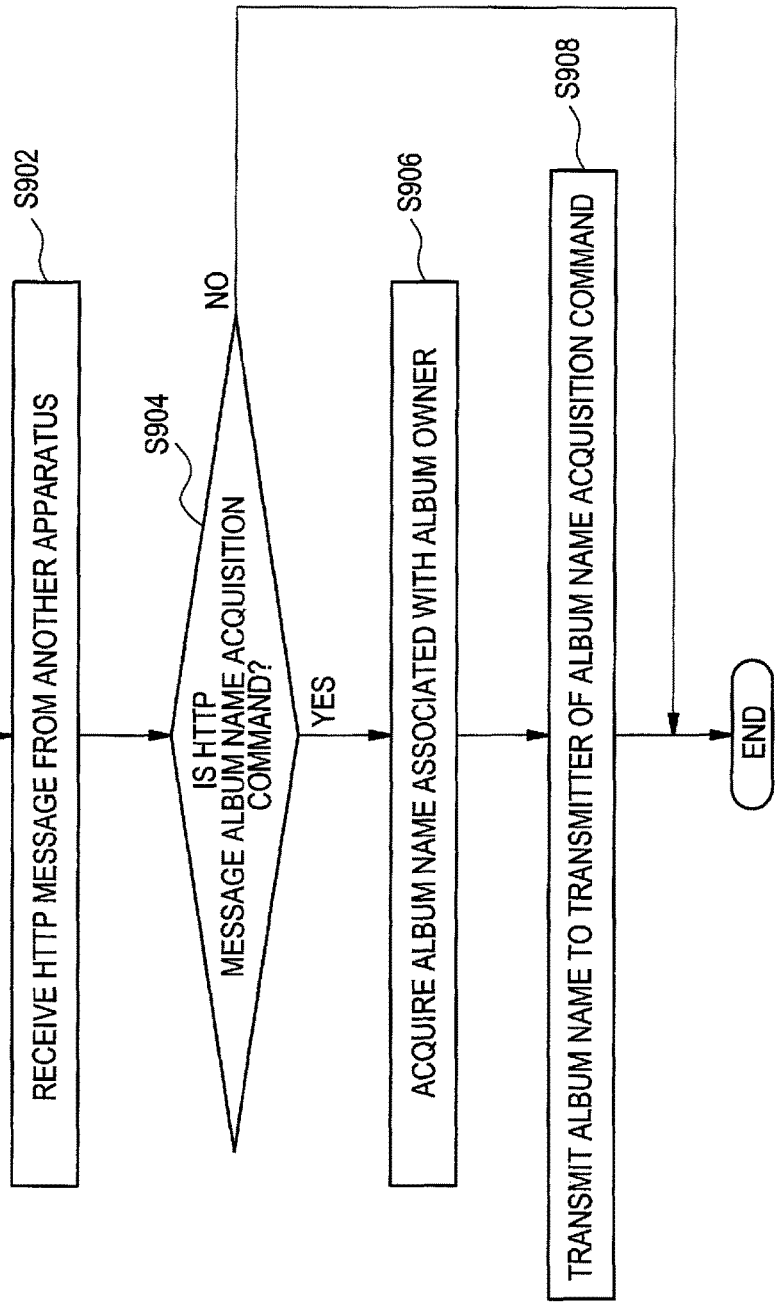
FIG. 9 is a view illustrating a service providing process executed in the service providing apparatus.

As shown in FIG. 5B, the album name selection UI includes album names 118 and selection keys 120 as components. The album names 118 are album names that the relay apparatus 200 receives from the service providing apparatus 300. In a case where all album names 118 are not displayed in the album name selection UI at once, the user can change displayed album names 118 by manipulating the selection keys 120. The user can select a desired album name from the displayed album names 118. The album name selected in the MFP 100 may be notified to the service providing apparatus 300 through the relay apparatus 200. The subsequent processes will not be described in the present embodiment.

As described above, the MFP 100 has no program for using the API for the service providing apparatus 300, so as not to directly use the API provided in the service. However, according to the present embodiment, the MFP 100 can acquire the information (album name) on the service, obtained by communication with the service providing apparatus 300, through the relay apparatus 200.

Also, since the MFP 100 has no program for using the service, it is not required to rewrite firmware and the programs of the MFP 100 in order for update of the API according to service provider's reasons and addition of a service. Therefore, it is possible to reduce a burden of maintenance of the MFP 100. In order words, the maker of the MFP 100 can respond to a change on the service provider side only by updating or rewriting the programs of the relay apparatus 200.

Further, the MFP 100 outputs requested information in response to the DB reading command received from the relay apparatus 200. Therefore, the MFP 100 is not required to have high process performance, and can output appropriate information to the relay apparatus 200 even when the MFP 100 does not have programs for responding to a plurality of kinds of services.

Furthermore, since information, such as the previously used album owner, used for communication with the service providing apparatus 300 is stored in the DB 104a of the MFP 100, it is possible to suppress a load on the relay apparatus 200. In a case where a database similar to the DB 104a is provided on the relay apparatus 200 side, as the number of MFPs 100 using the relay apparatus 200 increases, flocking to the database of the relay apparatus 200 occurs and the load is likely to cause a disorder. According to the present embodiment, the load on the relay apparatus 200 is suppressed, and high process performance is not required. Therefore, it is possible to suppress the operational cost of or equipment investment for the relay apparatus 200.

A command executing process is a process of executing processes in response to commands received from the relay apparatus 200, and is repeatedly executed while the account selected in the MFP 100 is logged in.

First, the CPU 101 receives a command transmitted from the relay apparatus 200 in step U602, and determines whether the command is a DB reading command in step S604. If the result of the determination in step S604 is positive (Yes in step S604), the CPU 101 reads the DB 104a in step S606, and transmits a DB read completion notification to the relay apparatus 200 in step 608. The DB read completion notification includes the previously used album owner stored in the DB 104a in association with the combination of the logged-in service and the account. Then, the CPU 101 returns to step 602 to receive the next command.

If the received command is not a DB reading command (No in step S604), in step S610, the CPU 101 determines whether the command is an album owner input UI display command or not. If the result of the determination in step S610 is positive (Yes in step S610), in step S612, the CPU 101 displays an album owner input UI. Next, the CPU 101 waits for a user's input in step S614, and determines whether the user has performed an input completion event or not, in step S615. Specifically, the CPU 101 determines whether the OK key 116 (see FIG. 5A) included in the album owner input UI has been touched by the user. If the result of the determination in step S615 is negative (No in step S615), in subsequent step S616, the CPU 101 determines whether the user has performed a manipulation for a change of the album owner. Specifically, the CPU 101 determines whether the edit keys 114 (see FIG. 5A) included in the album owner input UI have been touched by the user.

If it is determined that the user has not performed any manipulation for a change (No in step S616), the CPU 101 returns to step S614. Meanwhile, if it is determined that the user has performed a manipulation for a change (No in step S616), the CPU 101 changes the album owner displayed in the input box 112 on the basis of the user's manipulation in step S617, and returns to the process of step S614.

In an alternating succession of those processes, if it is determined that the user has performed an input completion event (Yes in step S615), in step S618, the CPU 101 transmits an album owner input event to the relay apparatus 200. If the previously used album owner displayed as the initial value is not changed, the CPU 101 includes the previously used album owner in the DB read completion notification and outputs the DB read completion notification including the previously used album owner to the relay apparatus 200. Meanwhile, if the previously used album owner displayed as the initial value is changed, in step S618, the CPU 101 includes the changed album owner in the album owner input event and outputs the album owner input event including the changed album owner to the relay apparatus 200. Then, the CPU 101 returns to step S602 to receive the next command.

If the received command is not a DB reading command and is not an album owner input UI display command (No in steps S604 and S605), in step S620, the CPU 101 determines whether the command is an album owner DB write command or not. If the result of the determination in step S620 is positive (Yes in step S620), in step S622, the CPU 101 stores the album owner included in the album owner DB write command, in the DB 104a in association with the combination of the type information of the logged-in service and the account. Therefore, the MFP 100 can appropriately update the DB 104a in response to a command from the relay apparatus 200.

Next, in step S624, the CPU 101 transmits a DB write completion notification to the relay apparatus 200. After the process of step S624 ends, or if the result of the determination in step S620 is negative (No in step S620), the CPU 101 returns to step S602 to receive the next command. Actually, from the relay apparatus 200 and the MFP 100, other commands such as the album name selection UI display command described with reference to FIG. 4 may be further transmitted. However, processes which the MFP 100 executes if receiving other commands is not shown in the flow chart of FIG. 6 and will not be described.

An MFP responding process is a process for executing processes responding to events received from the MFP 100, and is repeatedly executed after the relay apparatus 200 is powered up.

First, in step S702, the CPU 201 receives an event from the MFP 100. Next, in step S704, the CPU 201 determines whether an album owner input UI request event has been received or not. If the result of the determination in step S704 is positive (Yes in step S704), the CPU 201 generates a DB reading command in step S705, and transmits the DB reading command to the MFP 100, which is the event transmitter, in step S706. Then, the CPU 201 returns to step S702 to receive the next event transmitted from the MFP 100.

If it is determined that any album owner input UI request event has not been received (No in step S704), in step S708, the CPU 201 determines whether a DB read completion notification has been received or not. If the result of the determination in step S708 is positive (Yes in step S708), in step S709, the CPU 201 acquires the previously used album owner included in the DB read completion notification. Next, the CPU 201 generates an album owner input UI display command in step S710, and transmits the album owner input UI display command to the MFP 100 in step S712. As described above, the album owner input UI display command includes the UI display data for drawing the album owner input UI in the MFP 100, and the UI display data includes the previously used album owner received from the MFP 100 by the relay apparatus 200. However, the relay apparatus 200 may include the designation information for specifying the previously used album owner to be the initial value of the input box 112, in the UI display data, and transmit the UI display data including the designation information to the MFP 100, and the MFP 100 may read the previously used album owner specified by the designation information, from the DB 104a, and display the previously used album owner as the initial value of the input box 112. Meanwhile, if the result of the determination in step S708 is negative (No in step S708), the CPU 201 skips the processes of steps S709 to S712.

Next, in step S714, the CPU 201 determines whether an album owner input event has been received from the MFP 100 or not. If the result of the determination in step S714 is negative (No in step S714), the CPU 201 proceeds to step S724. Meanwhile, if the result of the determination in step S714 is positive (Yes in step S714), the CPU 201 compares the previously used album owner (that is, the album owner displayed as the initial value in the album owner input UI) and the album owner included in the album owner input event (that is, the album owner confirmed in the MFP 100) in step S716, and determines whether both album owners are different from each other or not, in step S718.

If it is determined that both owners are the same (No in step S718), that is, if it is determined that use of the previously used album owner has been permitted by the MFP 100, the CPU 201 generates an album name acquisition command including the previously used album owner, and transmits the album name acquisition command to the service providing apparatus 300 in step S726. As described above, if the user permits the previously used album owner to be used at this time, the relay apparatus 200 performs communication with the service providing apparatus 300 using the previously used album owner.

Meanwhile, if the previously used album owner and the album owner confirmed in the MFP 100 are different from each other (Yes in step S718), the CPU 201 generates an album owner DB write command in step S720, and transmits the album owner DB write command to the MFP 100 in step S722. Then, in step S724, the CPU 201 determines whether a DB write completion notification has been received or not. If the result of the determination in step S724 is negative (No in step S724), the CPU 201 returns to step S702 to receive the next event transmitted from the MFP 100.

Meanwhile, if a DB write completion notification has been received (Yes in step S724), the CPU 201 generates an album name acquisition command including the album owner changed in the MFP 100, and transmits the album name acquisition command to the service providing apparatus 300 in step S726. In other words, the relay apparatus 200 performs communication with the service providing apparatus 300 using the album owner changed in the MFP 100. Therefore, communication with the service providing apparatus 300 according to the intent of the user of the MFP 100 is possible.

An album name relay process is a process for receiving an album name from the service providing apparatus 300 and transmitting the album name to the MFP 100.

First, the CPU 201 receives an event from the service providing apparatus 300 in step S802, and determines whether an album name acquisition completion notification has been received from the service providing apparatus 300, in step S804. If the result of the determination in step S804 is negative (No in step S804), the CPU 201 returns to step S802 to receive the next event transmitted from the service providing apparatus 300.

Meanwhile, if the album name acquisition completion notification has been received (Yes in step S804), the CPU 201 generates an album name selection UI display command in step S806, and transmits the album name selection UT display command to the MFP 100 in step S808. Then, the CPU 201 returns to step S802 to repeat the processes.

A service providing process is a process repeatedly executed by a CPU (not shown) provided in the service providing apparatus 300, and is a process for transmitting an album name in response to a request from another apparatus.

First, the CPU of the service providing apparatus 300 receives an HTTP message transmitted from another apparatus, in step S902, and determines whether the HTTP message is an album name acquisition command or not, in step S904. If the result of the determination in step S904 is negative (No in step S940), the service providing process ends. Meanwhile, if the result of the determination in step S904 is positive (Yes in step S940), the CPU acquires an album name associated with the album owner included in the album name acquisition command, in step S906, transmits the album name to the transmitter of the album name acquisition command (for example, the relay apparatus 200) in step S908, and ends the process.

In the above-mentioned embodiment, the service cooperation system 10 is an example of a communication system, and the MFP 100 is an example of a communication apparatus. The account is an example of user identification information, and the album owner is an example of additional information. The DB 104a is an example of an additional-information storage unit, and the HDD 204 is an example of a program storage unit.

The CPU 101 of the MFP 100 executing the command executing process (see FIG. 6) is an example of a command executing unit. The CPU 101 executing step S617 is an example of a changing unit, and the CPU 101 executing step S618 is an example of a change notifying unit.

The CPU 201 of the relay apparatus 200 executing step S705 is an example of an output-command generating unit, and the CPU 201 executing step S706 is an example of an output command unit. The CPU 201 executing step S709 is an example of an additional-information acquiring unit. The CPU 201 executing step S710 is an example of a display-command generating unit, and the CPU 201 executing step S711 is an example of a display commanding unit. The CPU 201 executing step S718 is an example of a determining unit.

The CPU 201 executing step S720 is an example of a storage-command generating unit, and the CPU 201 executing step S722 is an example of a storage commanding unit. The CPU 201 executing steps S726 and S802 is an example of a first communication unit. The CPU 201 executing step S808 is an example of a second communication unit.

Although the present invention has been described on the basis of the embodiment, it is easily inferable that the present invention is not limited to the above-mentioned embodiment, but may be variously modified for improvement without departing from the scope of the invention.

For example, in the embodiment, the MFP 100 is an example of the communication apparatus. However, various apparatuses such as a portable phone and a digital camera may be examples of the communication apparatus. Also, in the embodiment, the relay apparatus 200 is a physically existing server. However, the relay apparatus 200 may be a virtual machine (for example, EC2 of Amazon (a registered trademark)) acting as a server in cooperation with a plurality of physical apparatuses. Further, in the embodiment, the relay apparatus 200 is disposed by the maker of the MFP 100. However, a known rental server may be used as the relay apparatus 200. In these cases, the operational cost of the relay apparatus 200 changes according to an amount of information passing through the relay apparatus 200, and a load of processing on the relay apparatus 200. According to the embodiment, since it is possible to reduce the load on the relay apparatus 200, it is possible to suppress the operational cost.

In the embodiment, the service providing apparatus 300 manages image files. However, the service providing apparatus may include a plurality of contents and provide a service for enabling clients to use the contents. As the contents, voice files and image files can be exemplified. In this case, the communication system may transmit additional information associated with the contents, from the relay apparatus to the service providing apparatus, and transmit contents extracted when the additional information is used as a condition, or specification information for specifying the corresponding contents (for example, a file name list), from the service providing apparatus to the relay apparatus, and the relay apparatus may transmit the received contents or specification information to the communication apparatus.

In the embodiment, the additional information is the previously used album owner. However, all kinds of meta information, such as a previously used password, a file type, a file generating time, and frequently-used information, associated with the contents can be examples of the additional information.

Also, the UI for selecting an account in the MFP 100 may be displayed in the MFP 100 on the basis of a display command from the relay apparatus 200.

Figure 10A:
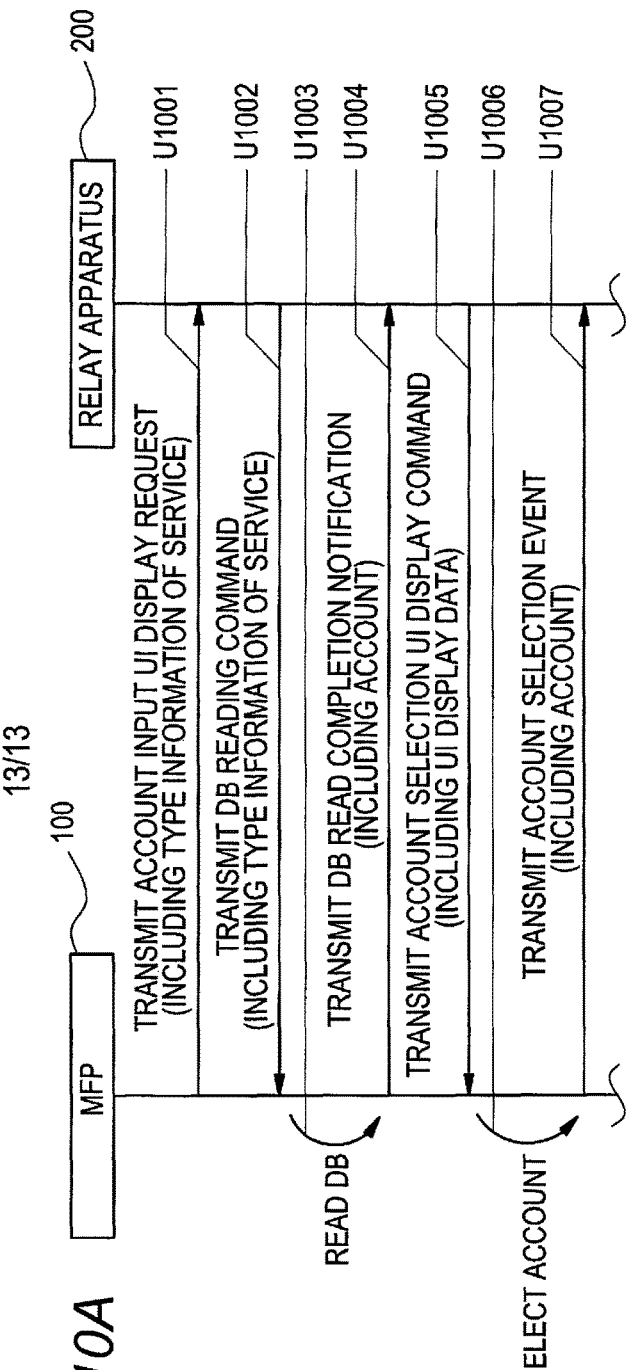
FIG. 10A is a sequence view schematically illustrating a flow of communication between an MFP and a relay apparatus constituting a service cooperation system according to a modification.

FIG. 10A is a sequence view schematically illustrating a flow of communication between an MFP 100 and a relay apparatus 200 constituting a service cooperation system 10 according to a modification. The electrical configuration of the MFP 100 and the relay apparatus 200 of the modification is the same as the electrical configuration of the MFP 100 and the relay apparatus 200 of the embodiment. First, in step U1001, the MFP 100 notifies an account input UI display request to the relay apparatus 200. The account input UI display request includes the type information of the service selected in the MFP 100. Then, in step U1002, the relay apparatus 200 transmits a DB reading command to the MFP 100. The DB reading command is for instructing the MFP 100 to extract an account stored in the DB 104a in association with the type information of the service selected by the user, and includes the type information of the service notified by the MFP 100.

If receiving the DB reading command, the MFP 100 reads the DB 104a in step U1003 so as to extract an account stored in the DB 104a in association with the type information included in the DB reading command (that is, the type information of the service selected by the user), and transmits an DB read completion notification including the extracted account to the relay apparatus 200 in step U1004. Then, the relay apparatus 200 generates an account selection UI display command for displaying an account selection UI in the MFP 100, and transmits the account selection UI display command to the MFP 100 in step U1005. The account selection UI display command includes UI display data for drawing the account selection UI in the MFP 100.

Figure 10B:
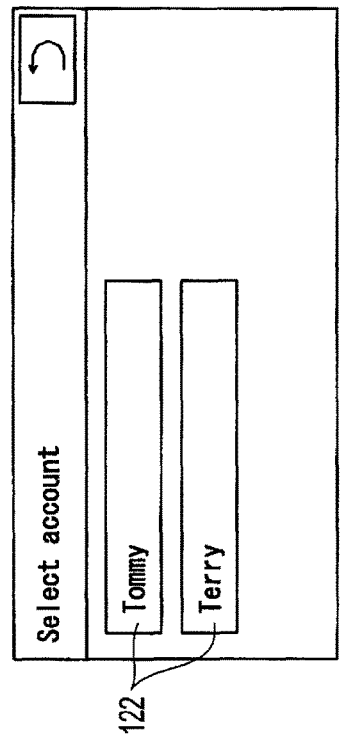
FIG. 10B is a view illustrating an example of an account name selection UI displayed in the MFP according to the modification.

FIG. 10B is a view illustrating an example of the account selection UI displayed in the MFP 100 on the basis of the account selection UI display command. As shown in FIG. 10B, the account selection UI includes accounts 112 notified to the relay apparatus 200 by the MFP 100. Therefore, the user of the MFP 100 can look at the accounts, stored in the DB 104a in association with the selected service, by the account selection UI and easily select a desired account.

Referring to FIG. 10A again, if an account is selected in the MFP 100 in step U1006, the MFP 100 notifies the relay apparatus 200 of an account selection event including the selected account in step U1007. Then, the relay apparatus 200 logs in to the service, using the account notified by the MFP 100, as similar to the embodiment.

In the modification, the CPU 101 of the MFP 100 executing the process of step U1004 is an example of an extracted-information output unit. The CPU 201 of the relay apparatus 200 executing the process of step U1005 is an example of a second display-command generating unit and a second display commanding unit.

In the embodiment, from the relay apparatus 200 to the MFP 100, the album owner input UI or the UI display data for drawing the album name selection UI are transmitted. However, the UI display data may be image data or may be information including information designating a template owned by the MFP 100, and information (for example, the previously used album owner or file name) to be displayed in the corresponding template.

The relay apparatus 200 may transmit entire information on the service obtained by communication with the service providing apparatus 300, to the MFP 100, or may edit, process, or convert the information on the service obtained by communication with the service providing apparatus 300, and transmit the information on the service to the MFP 100. The relay apparatus 200 may includes an updating unit for updating a program necessary for using the API. The updating unit may update the program periodically or may update the program in response to an updating notification transmitted from the service providing apparatus.

In the MFP 100, the DB 104a may be provided in an external memory or an installable memory cart.

In the embodiment, the MFP 100 cannot interpret HTML and thus cannot display web pages provided by the service providing apparatus 300. However, the aspect of the disclosure is applicable to a communication system in which a communication apparatus is configured to be able to use a service through a relay apparatus, and thus is also applicable to a case where the communication apparatus can interpret information provided by the service providing apparatus. In other words, the aspect of the disclosure is applicable to any communication system in which a relay apparatus can interpret information communicated between the relay apparatus and a service providing apparatus, and a relay apparatus and a communication apparatus can interpret information communicated between the relay apparatus and the communication apparatus. Also, the language used for communication between the communication apparatus and the relay apparatus may be a language other than XML.

What is claimed is:

1. A relay apparatus connectable through a network to a plurality of service providing apparatuses respectively providing services for managing image files as an album and a communication apparatus including a storage, the relay apparatus comprising:
   a processor; and
   memory configured to store plural pieces of programs for performing communication with corresponding one of the plurality of service providing apparatuses, and computer readable instructions, when executed by the processor, causing the relay apparatus to:
   in a first communication, receive first notification including a service from the communication apparatus;
   in the first communication, receive second notification including user identification information from the communication apparatus;
   in the first communication, receive, from the communication apparatus, album owner information which defines an owner of the album;
   in the first communication, generate a storage command for commanding the communication apparatus to store, in the store, a specific album owner information being associated with the service included in the first notification and the user identification information included in the second notification;
   in the first communication, transmit the generated storage command to the communication apparatus;
   in the first communication, transmit the received specific album owner information to the service providing apparatus corresponding to the service included in the first notification, by executing a specific processing using the acquired specific album owner information and the program for performing communication with the corresponding service providing apparatus that is stored in the memory;
   in the first communication, receive an album name of the album, which is extracted from a database in the service providing apparatus corresponding to the service included in the first notification, based on the acquired specific album owner information; and
   in the first communication, transmit, to the communication apparatus, the received album name,
   in a second communication, receive the first notification including the service from the communication apparatus;
   in the second communication, receive the second notification including the user identification information from the communication apparatus;
   in the second communication, generate an output command for commanding the communication apparatus to output the specific album owner information stored in the storage of the communication apparatus, the specific album owner information being associated with the combination of the service included in the received first notification and the user identification information included in the received second notification, the specific album owner information being stored in the storage at the time of the first communication and being unnecessary to be stored in the relay apparatus between the first communication and the second communication;
   in the second communication, transmit the generated output command from the relay apparatus to the communication apparatus;
   in the second communication, acquire specific album owner information output from the communication apparatus in response to the output command;
   in the second communication, generate a display command including selection screen data, which includes the specific album owner information, the display command commanding the communication apparatus to display a selection screen showing the specific album owner information;
   in the second communication, transmit the display command to the communication apparatus;
   in the second communication, receive the specific album owner information from the communication apparatus when the specific album owner information shown in the selection screen is selected;
   in the second communication, transmit the received specific album owner information to the service providing apparatus corresponding to the service, by executing a specific processing using the acquired specific album owner information and the program for performing communication with the corresponding service providing apparatus that is stored in the memory;
   in the second communication, receive the album name, which is extracted from the database in the service providing apparatus corresponding to the service, based on the acquired specific album owner information; and
   in the second communication, transmit, to the communication apparatus an album name selection user interface display command for commanding the communication apparatus to display an album name selection user interface including the received album name.

2. The relay apparatus according to claim 1 further configured to:
   generate a display command for commanding the communication apparatus to display a screen including the additional information output from the communication apparatus, and
   transmit, to the communication apparatus, the display command generated.

3. The relay apparatus according to claim 2 further configured to:
   determine whether use of the additional information displayed in the communication apparatus in response to the display command is permitted by the communication apparatus,
   wherein if the relay apparatus determines that use of the additional information is permitted by the communication apparatus, the relay apparatus performs communication with the service providing apparatus using the additional information acquired.

4. The relay apparatus according to claim 2, wherein
   if the additional information displayed in the communication apparatus in response to the display command is changed and the relay apparatus receives the notification of the change of the additional information, the relay apparatus performs communication with the service providing apparatus using the changed identification information.

5. The relay apparatus according to claim 2 further configured to:

generate, if the additional information displayed in the communication apparatus in response to the display command is changed and the relay apparatus receives the notification of the change of the additional information, a storage command for storing the changed additional information, in the communication apparatus in association with the service and the identification information included in the notification received; and transmit the storage command to the communication apparatus.

6. The relay apparatus according to claim 1, wherein after receiving the notification including the user identification information from the communication apparatus, adding the user identification information to each command transmitted to the communication apparatus.

7. The relay apparatus according to claim 1, further configured to store type information of the service, and the user identification information registered in the service, in association with each other, receive the user identification information stored in association with the type information of the service selected by a user, generate a second display command for commanding the communication apparatus to display a screen for selecting user identification information from the user identification information received and transmit the second display command generated to the communication apparatus, and notify the user identification information selected in the screen, from the communication apparatus, the screen being displayed in the communication apparatus in response to the second display command.

8. The relay apparatus according to claim 1, wherein the service providing apparatus stores a plurality of contents, and provides a service for enabling a client to use the contents, the relay apparatus transmits the additional information to the service providing apparatus and causes the service providing apparatus to transmit content or specification information for specifying the content to the relay apparatus, the content being extracted from a plurality of contents based on the transmitted additional information, and the relay apparatus transmits, to the communication apparatus, the contents or the specification information received by the relay apparatus.

9. The relay apparatus according to claim 1 further configured to update the program.

10. The relay apparatus according to claim 1, wherein the output command transmitted to the communication apparatus commands the communication apparatus to transmit previous additional information which is previously used and stored in the additional-information storage unit to the relay apparatus, the computer readable instructions when executed by the processor cause the relay apparatus to transmit a command to the communication apparatus to:

generate a display command for commanding the communication apparatus to display a screen including the previous additional information, and transmit the display command to the communication apparatus;

when the additional information acquired from the communication apparatus in response to the display command changes from the previous additional information, generate a command for commanding the communication apparatus to store the changed additional information in the additional-information storage unit; and receive a notification that the changed additional information is stored in the additional information storage unit from the communication apparatus.

11. The relay apparatus according to claim 1, wherein the output command transmitted to the communication apparatus includes the service and the user identification information, and the additional information which is stored in the additional information storage unit in association with the service and the user identification information which are included in the output command is acquired from the communication apparatus.

12. The relay apparatus according to claim 1, wherein the relay apparatus is configured to receive, from at least one of the plurality of service providing apparatuses, information associated with collectively managing image files as an album.

13. A communication system comprising a relay apparatus connected to a network, and a communication apparatus connected to the relay apparatus through the network, wherein:

in the network, a plurality of service providing apparatuses for providing services for managing image files as an album exist, the communication apparatus configured to:

in a first communication, transmit first notification including the service selected in the communication apparatus to the relay apparatus;

in the first communication, transmit second notification including user identification information selected in the communication apparatus to the relay apparatus;

in the first communication, transmit album owner information which defines an owner of the album to the relay apparatus;

in the first communication, receive storage command from the relay apparatus, the storage command being for commanding the communication apparatus to store, in the storage, a specific album owner information being associated with the service included in the first notification and the user identification information included in the second notification;

in the first communication, store the specific album owner information in the storage;

in the first communication, receive, from the relay apparatus, the album name acquired from the service providing apparatus corresponding to the service identified by the first notification;

in the second communication, transmit the first notification including the service to the relay apparatus;

in the second communication, transmit the second notification including the user identification information to the relay apparatus; and in the second communication, receive an output command for commanding the communication apparatus to output the specific album owner information stored in the storage of the communication apparatus, the specific album owner information being associated with the combination of the service included in the received first notification and the user identification information included in the received second notification, the specific album owner information being stored in the storage at the time of the first communication and being unnecessary to be stored in the relay apparatus between the first communication and the second communication;

in the second communication, output the album owner information in response to the output command, in the second communication, receive, from the relay apparatus, a display command including a selection screen data including the specific album owner information, the display command commanding the communication apparatus to display a selection screen showing the specific album owner information;

in the second communication, display the selection screen data including the specific album owner information;

in the second communication, transmit the specific album owner information to the relay apparatus when the specific album owner information shown in the selection screen is selected;

in the second communication, receive, from the relay apparatus, an album name selection user interface display command for commanding the communication apparatus to display an album name selection user interface including the album name; and in the second communication, displaying the album name selection user interface including the album name in response to the album name selection user interface display command, the relay apparatus configured to:

store a program in a program storage unit for performing communication with each of the plurality of service providing apparatuses;

in the first communication, receive the first notification;

in the first communication, receive the second notification from the communication apparatus;

in the first communication, receive, from the communication apparatus, the album owner information;

in the first communication, generate the storage command;

in the first communication, transmit the generated storage command to the communication apparatus;

in the first communication, transmit the received album owner information to the service providing apparatus corresponding to the service included in the first notification, by executing a specific processing using the acquired album owner information and the program stored in the program storage unit;

in the first communication, receiving an album name of the album which is extracted from a database in the service providing apparatus corresponding to the service included in the first notification based on the acquired album owner information; and in the first communication, transmit, to the communication apparatus, the received album name;

in the second communication, receive the first notification from the communication apparatus;

in the second communication, receive the second notification from the communication apparatus;

in the second communication, generate the output command;

transmit the generated output command to the communication apparatus;

acquire the specific album owner information output from the communication apparatus in response to the output command;

in the second communication, generate a display command including a selection screen data including the specific album owner information, the display command commanding the communication apparatus to display a selection screen showing the specific album owner information;

in the second communication, transmit the display command to the communication apparatus;

in the second communication, receive the specific album owner information from the communication apparatus when the specific album owner information shown in the selection screen is selected;

in the second communication, transmit the received album owner information to the service providing apparatus corresponding to the notification including the service using the specific album owner information and the program;

in the second communication, receive the album name which is extracted from the database in the service providing apparatus corresponding to the service based on the acquired specific album owner information; and transmit, to the communication apparatus, an album name selection user interface display command for commanding the communication apparatus to display an album name selection user interface including the received album name.

14. The communication system according to claim 13, wherein:

the relay apparatus is further configured to:

generate a display command for commanding the communication apparatus to display a screen including the additional information output from the communication apparatus, and transmit, to the communication apparatus, the display, and in the communication apparatus, display the screen including the additional information in response to the display command received from the relay apparatus.

15. The communication system according to claim 14, wherein the relay apparatus is further configured to determine whether use of the additional information displayed in the communication apparatus in response to the display command is permitted by the communication apparatus, and if the relay apparatus determines that use of the additional information is permitted by the communication apparatus, the relay apparatus performs communication with the service providing apparatus using the additional information acquired.

16. The communication system according to claim 14, wherein the communication apparatus is further configured to:

change the additional information displayed in response to the display command, on the basis of a user's manipulation, and output the additional information to the relay apparatus, and communicate with the service providing apparatus using the changed identification information.

17. The communication system according to claim 16, wherein the relay apparatus is further configured to:

generate a storage command for storing the changed additional information in association with the service and the identification information included in the received notification if receiving the changed additional information; and transmit the generated storage command to the communication apparatus, and the communication apparatus stores the additional information in response to the storage command received from the relay apparatus.

18. The communication system according to claim 13, wherein:
after receiving the notification of the identification information, the relay apparatus adds the identification information to each command transmitted from the relay apparatus to the communication apparatus, and
the communication apparatus adds the identification information to information to be output to the relay apparatus, in response to a command received from the relay apparatus.

19. The communication system according to claim 13, wherein
the communication apparatus stores type information of the service, and the user identification information registered in the service, in association with each other,
the communication apparatus is further configured to extract the user identification information stored in association with the type information of the service selected by a user, and outputs the user identification information to the relay apparatus,
the relay apparatus further configured to:
generate a second display command for commanding the communication apparatus to display a screen for allowing the user to select the user identification information transmitted from the communication apparatus; and
transmit the generated second display command, from the relay apparatus to the communication apparatus, and
notify the user identification information selected in the screen, from the communication apparatus to the relay apparatus, the screen being displayed in the communication apparatus in response to the second display command.

20. The communication system according to claim 13, wherein
the service providing apparatus stores a plurality of contents, and provides a service for enabling a client to use the contents,
the relay apparatus transmits the additional information to the service providing apparatus, and the service providing apparatus transmits contents or specification information for specifying the contents from the service providing apparatus to the relay apparatus in response to the additional information, and
the relay apparatus, to the communication apparatus, the contents or the specification information received by the relay apparatus.

21. A method of communicating through a network with a plurality of service providing apparatuses respectively providing services for managing image files as an album and a communication apparatus, the method comprising:
storing plural pieces of programs for performing communication with corresponding one of the plurality of service providing apparatuses;
in a first communication, receiving first notification including the service from the communication apparatus;
in the first communication, receiving second notification including user identification information from the communication apparatus;
in the first communication, receiving, from the communication apparatus, album owner information which defines an owner of the album;
in the first communication, generating a storage command for commanding the communication apparatus to store, in the storage, a specific album owner information being associated with the service included in the first notification and the user identification information included in the second notification;
in the first communication, transmitting the generated storage command to the communication apparatus;
in the first communication, transmitting the received album owner information to the service providing apparatus corresponding to the service included in the first notification, by executing a specific processing using the acquired album owner information and one or more of the plural pieces of programs for performing communication with corresponding one of the plurality of service providing apparatuses;
in the first communication, receiving an album name of the album which is extracted from a database in the service providing apparatus corresponding to the service included in the first notification based on the acquired album owner information; and
in the first communication, transmit, to the communication apparatus, the received album name;
in a second communication, receiving the first notification from the communication apparatus;
in the second communication, receiving the second notification from the communication apparatus;
in the second communication, generating an output command, for commanding the communication apparatus to output the specific album owner information stored in the storage of the communication apparatus, the specific album owner information being associated with the combination of the service included in the received first notification and the user identification information included in the received second notification, the specific album owner information being stored in the storage at the time of the first communication and being unnecessary to be stored in the relay apparatus between the first communication and the second communication;
in the second communication, transmitting the generated output command to the communication apparatus;
in the second communication, acquiring specific album owner information output from the communication apparatus in response to the output command;
in the second communication, generating a display command including a selection screen data including the specific album owner information, the display command commanding the communication apparatus to display a selection screen showing the specific album owner information;
in the second communication, transmitting the display command to the communication apparatus;
in the second communication, receive the specific album owner information for the communication apparatus when the specific album owner information shown in the selection screen is selected;
in the second communication, transmitting the received specific album owner information to the service providing apparatus corresponding to the service included in the received notification, by executing a specific processing using the acquired specific album owner information;
in the second communication, receiving the album name which is extracted from the database in the service providing apparatus corresponding to the service based on the acquired specific album owner information; and in the second communication, transmitting an album name selection user interface display command for commanding the communication apparatus to display an album name selection user interface including the received album name.

* * * * *